US007607206B2

(12) United States Patent
Walker, Jr. et al.

(10) Patent No.: US 7,607,206 B2
(45) Date of Patent: Oct. 27, 2009

(54) METHOD FOR FORMING LAYERED HEATING ELEMENT FOR GLOW PLUG

(75) Inventors: William J. Walker, Jr., Toledo, OH (US); John W. Hoffman, Perrysburg, OH (US); Jim May, Summerfield, OH (US)

(73) Assignee: Federal Mogul World Wide, Inc., Southfield, MI (US)

( * ) Notice: Subject to any disclaimer, the term of this patent is extended or adjusted under 35 U.S.C. 154(b) by 330 days.

(21) Appl. No.: 11/321,908

(22) Filed: Dec. 29, 2005

(65) Prior Publication Data

US 2007/0151096 A1 Jul. 5, 2007

(51) Int. Cl.
*B23P 19/04* (2006.01)

(52) U.S. Cl. ............................ 29/260; 29/611; 29/613; 29/619; 29/860; 123/145 A; 123/145 R; 219/267; 219/270; 219/544

(58) Field of Classification Search .................. 29/260, 29/611, 613, 619, 860; 123/145 A, 145 R; 219/267, 270, 544; 525/67, 70, 309
See application file for complete search history.

(56) References Cited

U.S. PATENT DOCUMENTS

| | | | | |
|---|---|---|---|---|
| 4,490,319 | A | 12/1984 | Lee et al. | |
| 4,695,759 | A | 9/1987 | Podiak | 313/136 |
| 4,923,829 | A | 5/1990 | Yasumtomi et al. | 501/95 |
| 5,286,802 | A * | 2/1994 | Uesugi et al. | 525/309 |
| 5,304,778 | A | 4/1994 | Dasgupta et al. | |
| 5,948,306 | A | 9/1999 | Konishi et al. | 219/548 |
| 5,993,722 | A | 11/1999 | Radmacher | 264/442 |
| 6,143,238 | A | 11/2000 | Konishi et al. | 264/614 |
| 6,156,238 | A | 12/2000 | Wotting et al. | 252/519.1 |

(Continued)

FOREIGN PATENT DOCUMENTS

JP 57012221 A 1/1982

(Continued)

OTHER PUBLICATIONS

Robert Bosch GmbH "Auxillary Starting Devices" Automotive Handbook 4$^{th}$ Edition, pp. 538-539, 1993.

(Continued)

*Primary Examiner*—Thiem Phan
(74) *Attorney, Agent, or Firm*—Robert L. Stearns; Dickinson Wright PLLC

(57) ABSTRACT

A monolithic, multi-layer heating element forms the high temperature tip of a glow plug assembly. The heating element includes a conductive core which is surrounded by an insulator layer, which in turn supports a resistive layer. An optional conductive jacket can surround the resistive layer. These layered components are pre-formed in prior operations and then assembled one into the other to form a precursor structure. The precursor structure is transferred to a die, where it is compressed to form a so-called green part having dimensional attributes proportional to the finished heating element. The individual layers remain substantially intact, with some boundary layer mixing possible to enhance material-to-material bonding. The green part is sintered to bond to various materials together into an essentially solid mass. Various finishing operations may be required, following which the heating element is assembled to form a glow plug.

26 Claims, 6 Drawing Sheets

U.S. PATENT DOCUMENTS

| | | | | |
|---|---|---|---|---|
| 6,274,079 | B1 | 8/2001 | Lindemann et al. | 264/614 |
| 6,299,958 | B1 | 10/2001 | St. Julien et al. | 428/73 |
| 6,309,589 | B1 | 10/2001 | Knoll et al. | 264/614 |
| 6,396,028 | B1 | 5/2002 | Radmacher | 219/270 |
| 6,563,093 | B2 | 5/2003 | Lindemann et al. | 219/544 |
| 6,610,964 | B2 | 8/2003 | Radmacher | 219/270 |
| 6,759,631 | B1 | 7/2004 | Geissinger et al. | |
| 6,777,361 | B2 | 8/2004 | Aichele et al. | 501/88 |
| 7,160,584 | B2 * | 1/2007 | Goeb et al. | 427/454 |
| 2004/0079745 | A1 | 4/2004 | Haluschka et al. | 219/260 |
| 2005/0118346 | A1 | 6/2005 | Goeb et al. | |
| 2005/0145613 | A1 | 7/2005 | Goeb et al. | 219/270 |

FOREIGN PATENT DOCUMENTS

| | | |
|---|---|---|
| JP | 62000731 | 1/1987 |

OTHER PUBLICATIONS

Champion Spark Plug Company. “Glow Plugs” Straight Talk About Spark Plugs, Glow Plugs, Igniters. A technical and Engineering Guide. pp. 32-35; 1987.

* cited by examiner 34
162
150
148
126
152
122

152
148
150
168
172

156
164
148
166
152
150
168
172

152
148
150
168
170
172

148
168
150
170
152
172

METHOD FOR FORMING LAYERED HEATING ELEMENT FOR GLOW PLUG

BACKGROUND OF THE INVENTION

1. Field of the Invention

The invention relates to a method for forming a fuel igniting glow plug, and more specifically toward a method for forming a layered heating element therefor.

2. Related Art

Glow plugs can be utilized in any application where a source of intense heat is required for combustion. As such, glow plugs are used as direct combustion initiators in space heaters and industrial furnaces and also as an aid in the initiation of combustion when diesel engines must be started cold. Glow plugs are also used as heaters to initiate reactions in fuel cells and to remove combustible components from exhaust systems.

With regard to the example of diesel engine applications, during starting and particularly in cold weather conditions, fuel droplets are not atomized as finely as they would be at normal running speeds, and much of the heat generated by the combustion process is lost to the cold combustion chamber walls. Consequently, some form of additional heat is necessary to aid the initiation of combustion. A glow plug, located in either the intake manifold or in the combustion chamber, is a popular method to provide added heat energy during cold start conditions.

The maximum temperature reached by the glow plug heating element is dependent on the voltage applied and the resistance properties of the components used. This is usually in the range of 1,000-1,300° C. Materials used in the construction of a glow plug are chosen to withstand the heat, to resist chemical attacks from the products of combustion and to endure the high levels of vibration and thermal cycling produced during the combustion process.

To improve performance, durability and efficiency, new materials are constantly being sought for application within glow plug assemblies. For example, specialty metals and ceramic materials have been introduced into glow plug applications. While providing many benefits, these exotic materials can be difficult to manufacture in high production settings. Sometimes, they are not entirely compatible with other materials, resulting in delamination and other problems. Another common problem with specialty materials manifests as tolerance variations when formed in layers resulting from cumbersome and inefficient manufacturing techniques.

Accordingly, there is a need for improved methods for forming glow plugs, and in particular the heating element portion of a glow plug using specialty materials which results in a precision formed, durable monolithic structure.

SUMMARY OF THE INVENTION

The invention comprises a method for forming a layered heating element for a fuel igniting glow plug. The method comprises the steps of pre-forming at least three layers with varying levels of electrical conductivity so that the assembly forms a resistor. The three layers comprise an electrically conductive core, an electrically non-conducting insulator layer, and an electrically resistive layer. The method further includes the steps of assembling a precursor structure by substantially enveloping the core within the insulator layer and then applying the resistive layer to the exterior of the insulator layer. The precursor structure is then compressed and thereafter subjected to a sintering step wherein the compressed precursor structure forms a monolithic heating element with the core bonded to the insulator layer and the insulator layer bonded to the resistive layer.

The invention further contemplates a method for forming a glow plug. The method comprises the steps of pre-forming an electrically conductive core, pre-forming an electrically non-conducting insulator layer, and pre-forming an electrically resistive layer. A precursor structure is then assembled by substantially enveloping the core within the insulator layer and applying the resistive layer to the exterior of the insulator layer. The precursor structure is then compressed and thereafter sintered to form a monolithic heating element with the core bonded to the insulator layer and the insulator layer bonded to the resistive layer. A conductive shell is provided and the sintered heating element inserted into the shell. An electrically conductive connection is established between the shell and the resistive layer of the heating element.

The subject invention offers a new and improved method for assembling a monolithic heating element by pre-forming a conductive core, an insulator layer and a resistive layer, and thereafter assembling these pre-forms into a precursor structure. The precursor structure is compressed to overcome any assembly tolerances and bring the constituent components closer to near full density. The sintering operation has the added effect of bonding the various layers one to another and thereby achieving a monolithic composite. Such a heating element can be manufactured to exacting tolerances from a vast variety of materials suitable to glow plug applications. For example, the pre-formed core, insulator layer and resistive layer can be made from common metals, specialty metals, ceramics, or combinations of these or other suitable materials.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
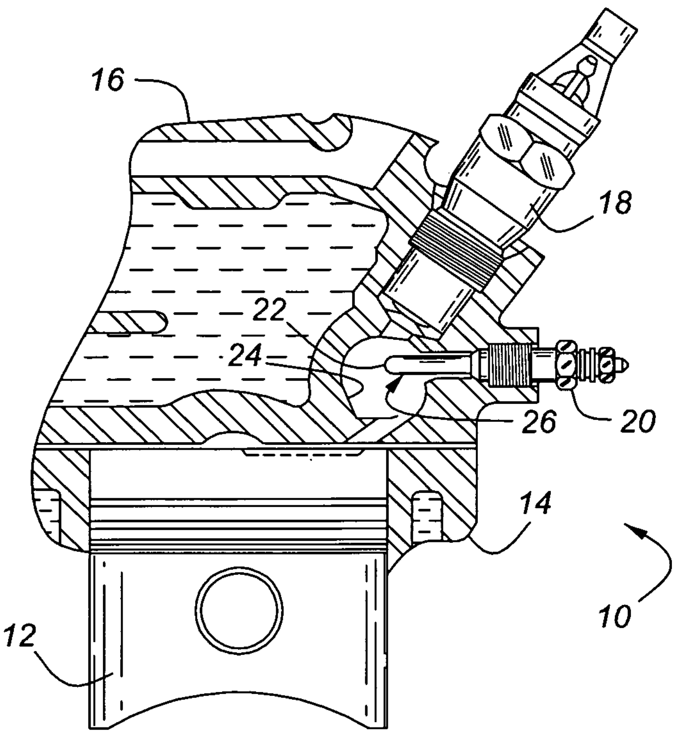
FIG. 1 is a simplified cross-sectional view of an exemplary glow plug installation in the pre-combustion chamber of a diesel engine.

Referring the Figures, wherein like numerals indicate like or corresponding parts throughout the several views, a diesel engine is generally shown at 10 in FIG. 1. The engine 10 includes a piston 12 reciprocating in a cylinder. The cylinder is formed in a block 14. A cylinder head 16 covers the block 14 to enclose a combustion chamber. An intake manifold routes through the cylinder head 16 and includes a fuel injector 18 which, at timed intervals, delivers a charge of atomized fuel into the combustion chamber. A glow plug, generally indicated at 20, includes a high temperature tip 22 positioned, in this example, within a pre-combustion chamber 24. The arrangement of components as illustrated in FIG. 1 is typical of one configuration style for a diesel engine. However, there are many other diesel engine types for which a glow plug 20 according to the invention is equally applicable. Furthermore, many other types of devices can utilize the subject glow plug 20, such as space heaters, industrial furnaces, fuel cells, exhaust systems, and the like. Accordingly, the subject glow plug 20 is not limited to use in diesel engine applications.

Figure 2:
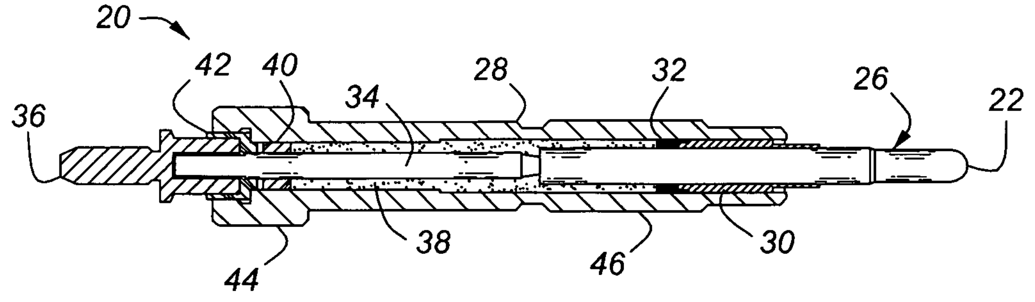
FIG. 2 is a cross-sectional view of a glow plug assembly according to the invention.
Figure 3:
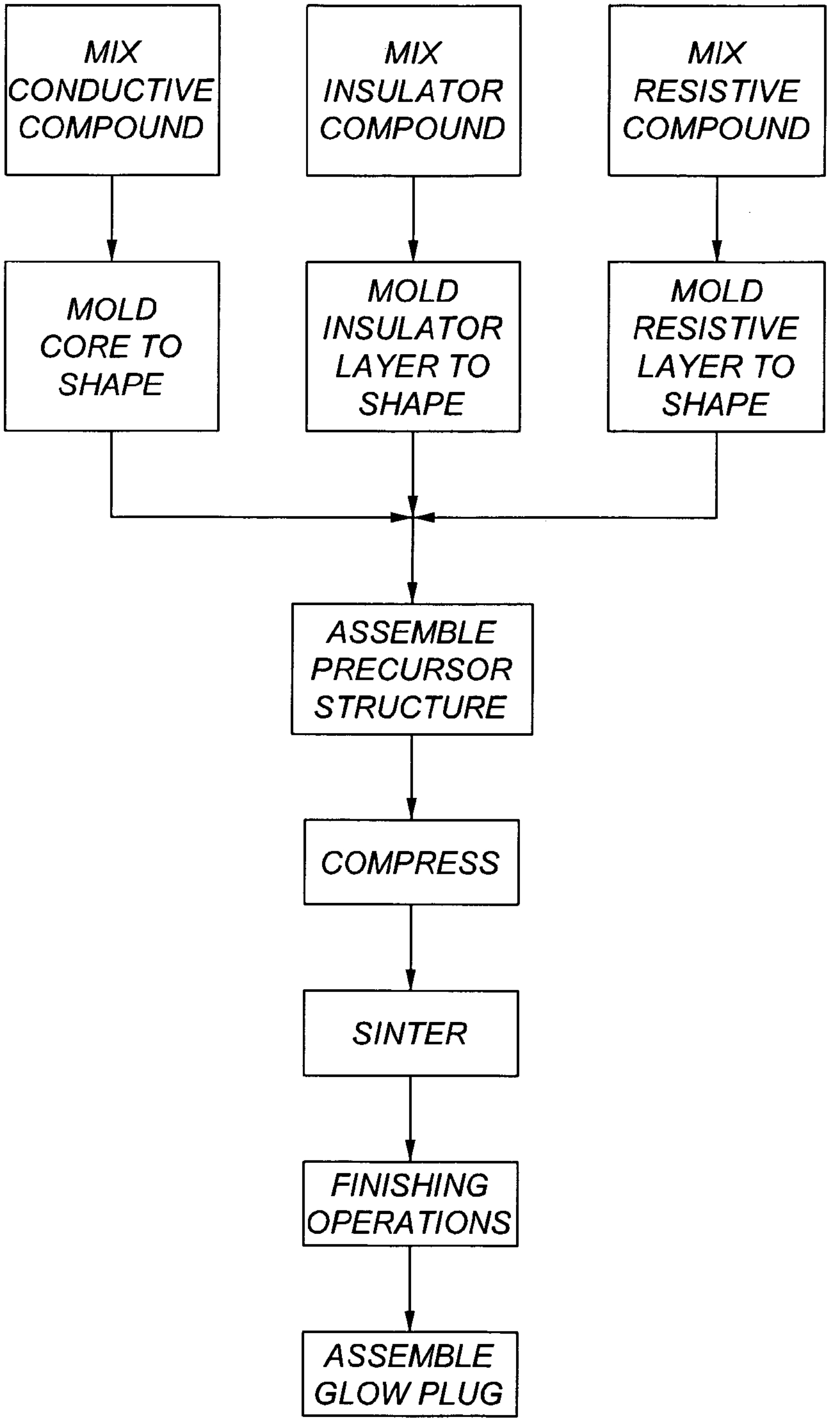
FIG. 3 is a flow chart illustrating a method of manufacturing a glow plug according to the invention.

Referring now to FIG. 2, a cross-sectional view of the glow plug 20 is depicted. Here, the high-temperature tip 22 is shown forming the distal end of a heating element, generally indicated at 26. The heating element 26 is a composite structure which protrudes from the end of a hollow shell 28, such as by a copper ring 30 and a brazed joint 32. By these means, the heating element 26 is both securely fixed in position relative to the shell 28 and held in electrically conductive relationship therewith. A proximal end of the heating element 26 is affixed to a conductive center wire 34, such as via a tapered and brazed joint. The proximal end of the center wire 34 holds a terminal 36 used to join an electrical lead (not shown) from the ignition system. The center wire 34 and terminal 36 are held in electrical isolation from the conductive shell 28 by way of an insulating layer of alumina powder 38, epoxide resin 40 and plastic gasket 42. Of course, alternative materials may be suitable to hold the center wire 34 and terminal 36 in position and in electrical isolation from the shell 28. The exterior of the shell 28 is provided with a tool fitting 44 and threads 46. Of course, the glow plug 20 can take numerous other forms and constructions, depending upon the materials used and its intended application.

Generally stated, the heating element 26 operates by passing an electrical current through a resistive material. The current is introduced to the heating element 26 through the center wire 34. Current flows through the heating element 26 and into the shell 28 which is typically metallic and grounded through the cylinder head 16 or other component of the device.

Turning now to FIGS. 3 and 4A-4E, a method for manufacturing the heating element 26 is described in greater detail. The method comprises the steps of pre-forming an electrically conductive core 48, pre-forming an electrically non-conducting insulator layer 50, and pre-forming an electrically resistive layer 52. A precursor structure is then assembled by substantially enveloping the core 48 within the insulator layer 50 and then applying or positioning the resistive layer 52 on the exterior of the resistive layer 52. The precursor structure is then compressed and thereafter sintered to form the monolithic heating element 26 with the core 48 bonded to the insulator layer 50 and the insulator layer 50 bonded to the resistive layer 52. The conductive shell 28 is provided and the sintered heating element 26 inserted into the shell 28. An electrically conductive connection is established between the shell 28 and the resistive layer 52 of the heating element 26. More specifically, the heating element 26 includes the electrically conductive core 48 which affixes directly to the center wire 34. As described above, this connection can be accomplished through a tapered and/or brazed connection, or other fitting as may be appropriate. The core 48 can take the form of a generally cylindrical body having a circular cross-section at generally in any position along its length. However, other cross-sectional shapes may be desired. For examples, the core 48 could have an oval or other axiosymmetric shape in cross-section, or a non-axiosymmetric shape. As another example, the core 48 could be hollow. Any suitable material can be used for the core 48, such as metals, conductive ceramics, ceramic/metal composites, and components selected from the group comprising $MoSi_2$, TiN, ZrN, TiCN and $TiB_2$. Metals can include platinum, iridium, rhenium, palladium, rhodium, gold, copper, silver, tungsten, and alloys of these to name a few. Composites formed by mixing insulating particles with electrically insulating particles can also form suitable materials.

Preferably, although not necessarily, the core 48 is entirely surrounded by the electrically non-conducting insulator layer 50. The insulator layer 50 can, for example, be made from the group comprising $Si_3N_4$, silicon carbide, aluminum nitride, alumina, silica and zirconia. Additives of boron nitride, compounds of tantalum, niobium, yttrium aluminum garnet (YAG), yttrium, magnesium, calcium, hafnium and others of the Lanthanide group can be used to compliment the later sintering process. Other examples of materials for the insulator layer 50 can include magnesium spinel, mullite, cordierite, silicate glasses and boron nitride. These are all but examples of useful material compositions, and in fact the insulator layer 50 can be made from any suitable pure compound or blend. The insulator layer 50 can also be a composite of conducting and non-conducing particles, where the conducting particles are present below the percolation limit.

Figure 7:
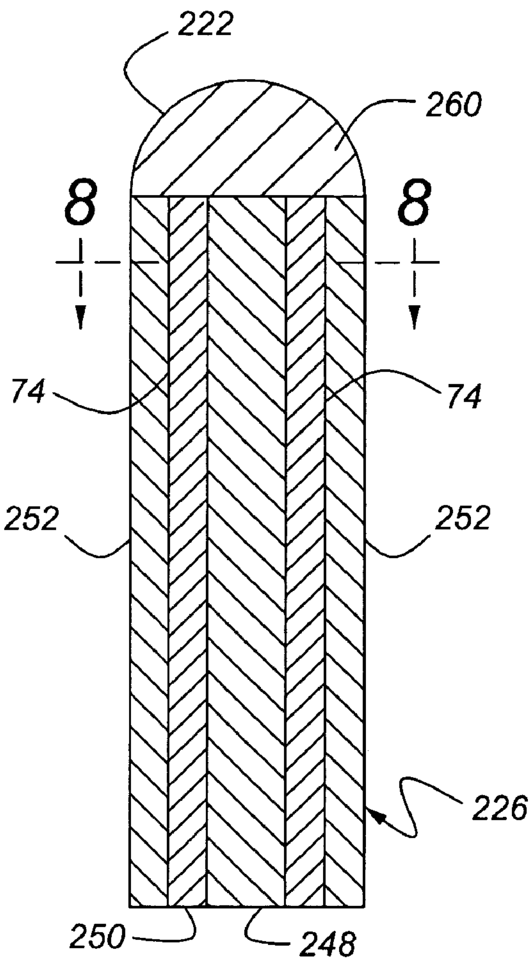
FIG. 7 is a longitudinal cross-section illustrating yet another alternative heating element construction.
Figure 8:
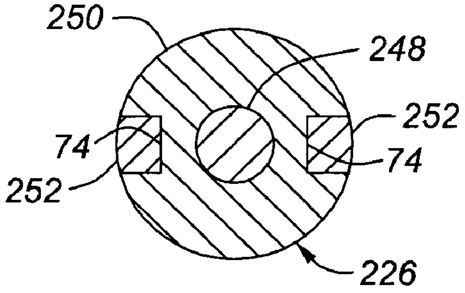
FIG. 8 is a cross-sectional view taken generally along lines 8-8 of FIG. 7.

The insulator layer 50, in the embodiments corresponding to FIGS. 3-6, is entirely surrounded by the resistive layer 52. An alternative embodiment of the invention is shown in FIGS. 7 and 8 where the resistive layer 252 is not tubular but instead may comprise one or more stripes applied to the exterior of the insulator layer 250. Other configurations are likewise possible within the scope of the invention. The resistive layer 52 can be made from any of the known materials and alloys having resistive, or moderately electrically conductive properties. The core 48, insulator layer 50 and resistive layer 52 are pre-formed and then assembled into a precursor structure, as shown in FIG. 4B.

At least one, but preferably all of the pre-formed members, i.e., the core 48, insulator layer 50 and resistive layer 52, are pre-formed as less than fully dense compositions of a ground base powder of conducting, non-conducting or resistive material, as the case may be, combined with an organic binder (e.g., wax) and a lubricant. The binder may be a mixture comprising multiple materials to hold the particles together. A plasticizer may or may not be present. The binder may use water, an organic solvent or oil. These constituents can be combined in proportions to create a paste or dough-like substance which is capable of being shaped by extrusion, die pressing, injection molding, stamping, rolling or the like. In the pre-formed condition, these articles are preferably self-supporting and capable of being transferred from one assembly operation to the next without breaking or losing shape.

The assembled precursor structure is then transferred to a closed-end die 54 and, under the influence of ram or punch 56, compressed so as to reduce its dimensional attributes and increase its overall density. The die cavity 58 into which the precursor structure is squeezed has a shape and dimensional attributes which are proportional to the desired finish shape and dimensions of a glow plug heating element 26. Thus, as the ram 56 forces the precursor structure into the die cavity 58, the respective layers 48, 50, 52 remain generally intact, without breach. Furthermore, each layer 48, 50, 52 is condensed and compressed in proportion to its density. This compressing step can be accomplished at ambient, elevated or sub-ambient temperature and/or through a sequence of progressive die cavities. Ideally, although not necessarily, a uniform density throughout each layer in the precursor structure will be achieved. Furthermore, the compression subjected upon the layers 48, 50, 52 within the closed-end die 54 will result in some boundary layer mixing and some controlled distortion to enhance the resulting and metallurgical/material bonds between each of the layers 48, 50, 52.

Figures 4A, 4B, 4C, 4D, 4E:
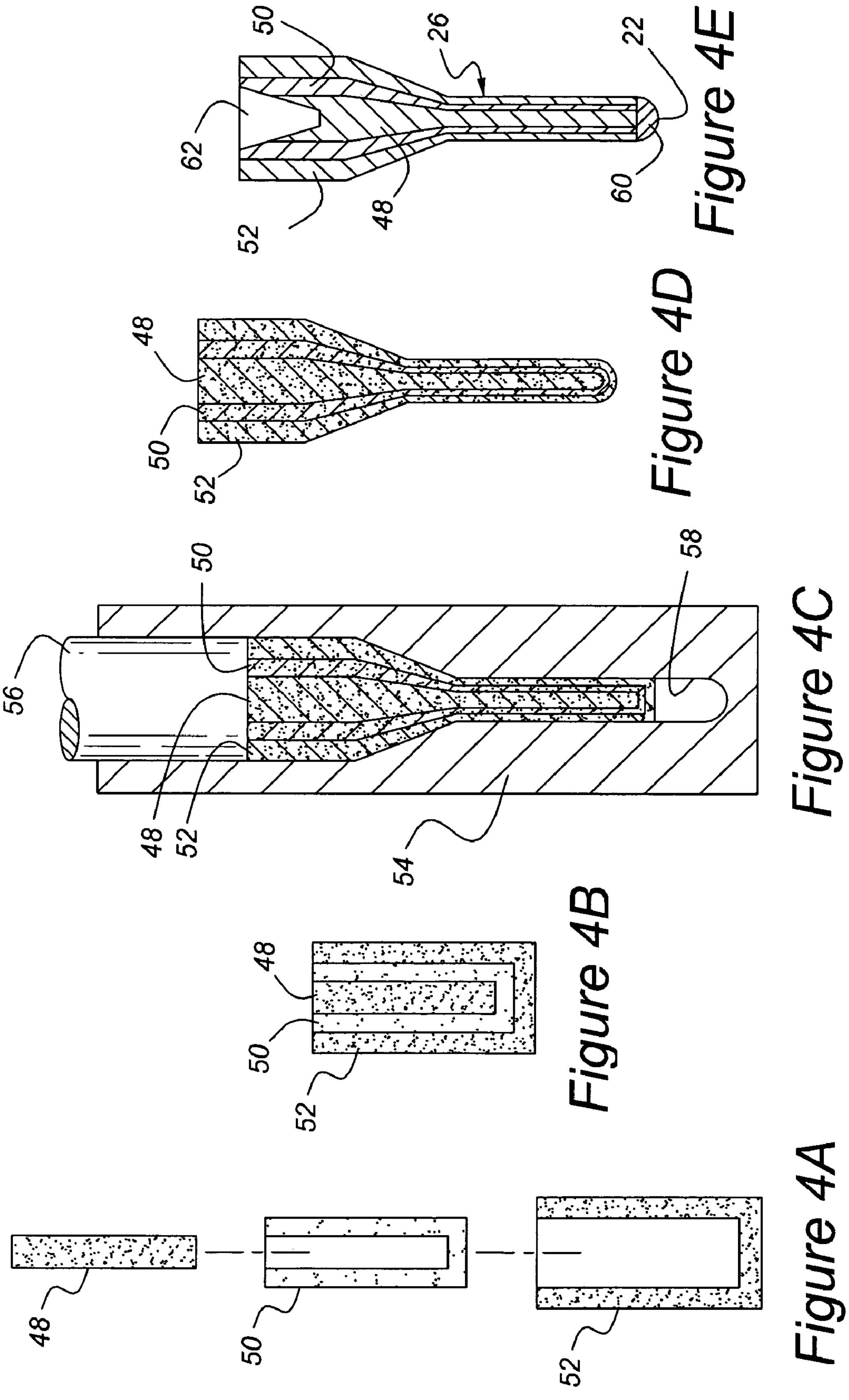
FIGS. 4A-4E illustrate, in simplified form, a progression of forming operations which begin with pre-formed materials and end with a finished glow plug according to the invention.

The fully compressed precursor structure is then removed from the closed-end die 54 as a so-called "green part." This green part is transferred to a sintering furnace where the constituent materials are sintered and any remaining binders and lubricants are driven out. The sintering operation is effective to transform the composite into a monolithic structure, i.e., a plurality of diverse materials are transformed into an integral member having essential unity of structure and purpose. Before the heating element 26 can be used in a glow plug, an electrical connection must be established between the core 48 and the resistive layer 52. One way to accomplish this is to remove the rounded end portion in a grinding or cutting operation and affix in its place an electrically conductive tip 60 as shown in FIG. 4E. This step can be performed either prior to or after sintering. The conductive tip 60 is effective to conduct electricity from the core 48 into the resistive layer 52, which in turn is in electrical contact with the shell 28. Other pre-sintering and/or post-sintering operations may be desirable, such as the formation of a tapered pocket 62 in the proximal end of the heating element 26 with which to receive a mating shaped end of the center wire 34. The tapered pocket 62 is carefully formed so as to maintain electrical isolation between the center wire 34 and the resistive layer 52. Other post-sintering operations can include grinding or polishing.

With regard to the lubricants and/or binders contained in the precursor structure, it is preferable to remove all or a portion of these from the finished heating element 26. Various options exist with regard to when and how to remove these lubricants and binders. The lubricant, for example, which is needed chiefly to facilitate working stresses encountered during the compression step, can be evaporated out of the precursor structure during the sintering step or can be removed in a separate drying operation while still in its green part state. For example, a pyrolosis operation can be performed prior to sintering to remove the majority of lubricants. The lubricant can also be removed by solvent or capillary/wicking action methods. Likewise, the binder is needed chiefly during the pre-formed states of the core 48, insulator layer 50 and resistive layer 52 for shape retention to facilitate handling of these parts prior to and while assembled as the precursor structure. The binder is needed to a much lesser degree after the precursor structure has been compressed in its green part state and is not needed at all after sintering. Thus, some, but preferably not all, of the binder can be removed by thermal, solvent or capillary action methods prior to the sintering step, with any remaining binder removed during the sintering step. Sometimes, removal of the lubricants and/or binders in an intermediate operation is useful for improved handling or finishing operations prior to sintering. The sintering step can also be modified to incorporate a low temperature (e.g. 200-500C) pyrolosis phase before the actual sintering temperatures are approached so as to remove lubricants and/or binders.

Figure 5D:
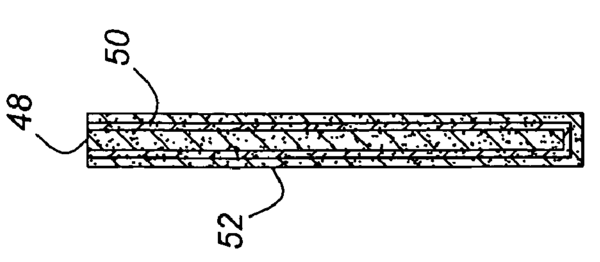
FIGS. 5A-5D are views as in FIGS. 4A-4D yet showing an alternative technique for compressing the precursor structure.

Referring to FIGS. 5A-5D, an alternative method for compressing the precursor structure is illustrated. Here, instead of using a closed-end die 54 as presented in FIG. 4C, an extrusion die 64 includes an exit orifice 66 which imparts a design shape to the compressed precursor structure. Like the closed-end die method, this extrusion die 64 can be heated as an option. The extruded shape can be circular or any other suitable cross-section. For instance, it may be desirable to impart a special shape into the heater element 26 so as to improve strength or achieve other objectives. As an example, the heating element 26 can be compressed into an aerodynamic shape whose contour properties help control the flow of air, fuel, and/or combustion gasses. Special shapes can be imparted for other reasons as well. As shown in FIG. 5D, the resulting green part has a consistent cross-sectional shape along its entire length, as is consistent with all extruded objects. The green part is then transferred to a sintering furnace where some shrinkage can be expected, yet the proportional dimensions of the various layers remain relatively intact. Additional finishing operations such as those described above in connection with FIG. 4E can also be accomplished here.

Figure 5C:
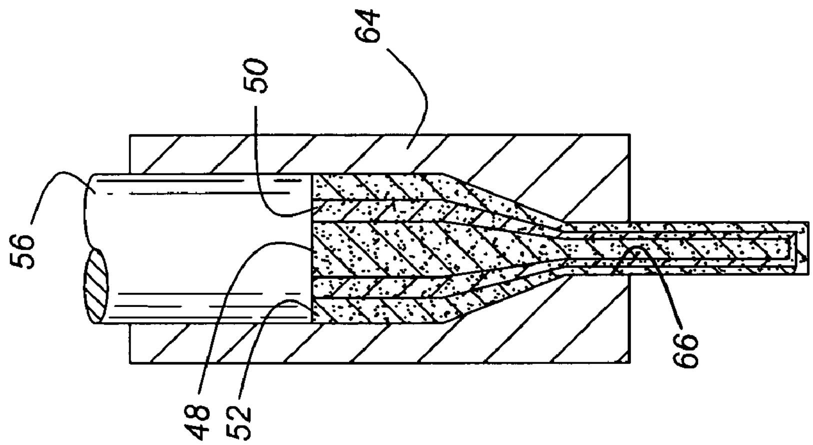
Figure 5B:
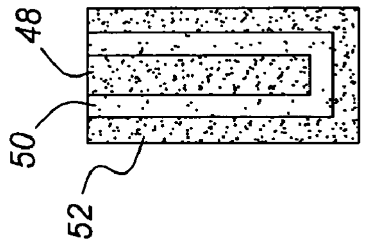
Figure 5A:
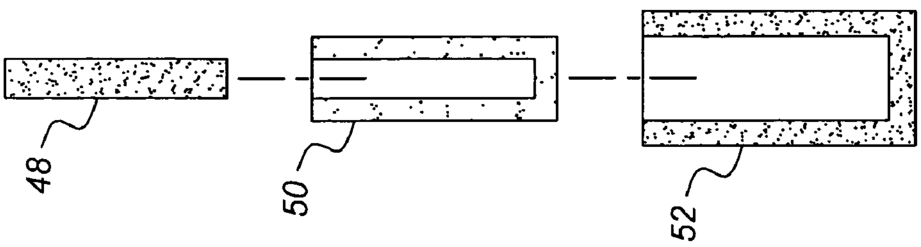

A particular advantage of the compression technique shown in FIG. 5C arises out of the inherent efficiency of extrusion as a manufacturing method. Typically, an extrusion die 64 is less expensive than a closed-end die 54, and product through-put is generally faster. Alternatives to the closed-end die 54 and extrusion die 64 can be applied here as well. For example, the compressing step can be accomplished by isostatic pressure, which is a technique well known in the sintered metal and ceramic arts. Other methods of compressing the precursor structure can include rotating the precursor structure between compression rollers, stamping, forging, injection molding, and the like. Any of these compression techniques can be conducted at general ambient, chilled or elevated temperatures as the situation may dictate. Furthermore, the steps of removing lubricant and a portion of the binder can be accomplished in partnership with the compressing tools.

Figures 6A, 6B, 6C, 6D, 6E:
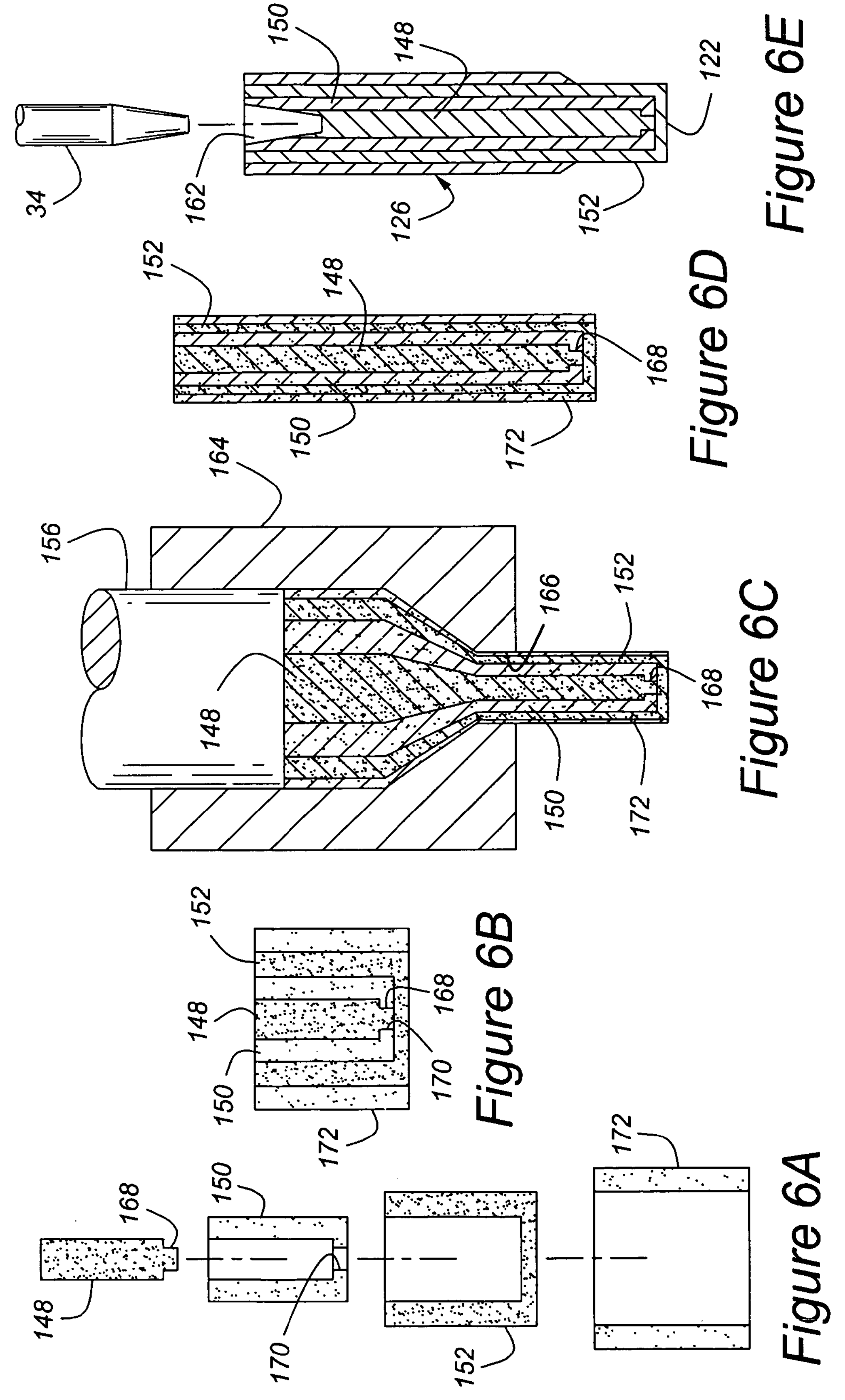
FIGS. 6A-6E are views similar to those shown in FIGS. 4A-4E, with an alternative heating element construction depicted.

FIGS. 6A-6E depict yet another variation in steps and construction for forming a heating element 126 according to the subject invention. For convenience, the prefix "1" is applied to the reference numbers to facilitate discussion and distinguish this alternative configuration from corresponding features in the preceding examples. Thus, as depicted in FIG. 6A, pre-formed components comprising a core 148, insulator layer 150 and resistive layer 152 have been provided. In this example, the core 148 has been formed with a shouldered extension 168. The insulator layer 150 has a complementary shaped opening 170 for receiving the extension 168 and allowing direct contact of the core 148 with the resistive layer 152. Thus, this arrangement describes an alternative method for establishing an electrical connection between the core 148 and the resistive layer 152 without the need for affixing a separate electrically conductive tip 60 as in FIG. 4E.

FIG. 6A also shows a pre-formed electrically conductive jacket 172 which is assembled together with the core 148, insulator layer 150 and resistive layer 152 to form the precursor structure as shown in FIG. 6B. The jacket 172 substantially envelopes the resistive layer 152 in the precursor structure. The jacket 172 can be made from a highly conductive material, such as a metal or metallic alloy. The jacket 172, like the core 148, insulator layer 150 and resistive layer 152, can be pre-formed by mixing an electrically conductive powder with an organic binder and a lubricant. The powder, binder and lubricant are pressed in a mold to form a self-supporting, i.e., shape holding, article like that shown in FIG. 6A. The mold used for the pre-forming operation can take the form of a closed-end die, extrusion die, stamping form, injection molding or pressure casting mold, or any other forming technique which is capable of creating a compressible self-supporting article. The four layer precursor structure is then placed into an extrusion die 164 as shown in FIG. 6C and subjected to a compression step to yield the densified green part of FIG. 6D. This green part is then sintered, following which one or more finishing operations may be required. As an example, and referring to FIG. 6E, it may be necessary to remove a portion of the conductive jacket 172 after the sintering step so as to create the proper physical and electrical properties for a high temperature tip 122 of the heating element 126. Alternatively, and in some cases preferably, operations such as removing part of the conductive jacket 172 are done to the green part before the sintering step. Furthermore, a tapered pocket 162 can be formed in the proximal end to receive the tapered end of a center wire 34.

A heating element 26, 126 made in accordance with these methods will yield an improved monolithic structure which is particularly conducive to high precision, high volume manufacturing operations. The method allows formation of very thin material layers because of the cross-sectional areas of the respective layers are reduced while maintaining the layered structure and with the layer thicknesses retaining their relative properties. Furthermore, because the compressing and sintering steps encourage mechanical, and/or material bonding between the various layers, the composite monolithic heating element 26, 126, exhibits durability in the harsh operating environments of a glow plug 20. Notwithstanding the specific materials and constructions described above and illustrated in the accompanying Figures, the subject methods can take many forms and the material compositions can be widely varied to meet differing specifications and application requirements. Furthermore, addition layers can be incorporated into the design.

The pre-form layers can be made by any of the forming methods that are commonly used in the ceramic art. The respective powders are typically milled to reduce the particle size and break apart any aggregates of particles. The powders are mixed with a liquid medium such as water and appropriate binders and lubricants in such a way to form a suitable feed material to produce the pre-form structures. One method is to prepare a thermoplastic paste comprising the powder, liquid, binder and lubricant, and to produce the pre-form layers by injection molding. A second method is to form a plastic paste and shape the pre-form layers by pressing this paste in a die. A third method is to process the powder, liquid medium, binder and lubricant into a granular feed material which is subsequently pressed into a die to shape the pre-form layers. A fourth method, which is especially suited to forming the core, is to prepare a paste and shape each pre-form layer by extrusion.

It is also envisioned that a heating element could be designed in such a way that the outer conducting or resisting layer does not completely encase the insulating layer. For example, as shown in FIGS. 7 and 8, where the prefix "2" is applied to the reference numbers of corresponding features introduced previously, the pre-form for the insulating layer 250 may have one or more grooves 74 in its outer surface, and the pre-form for the outer conductor or resistor layer 252 is shaped to fit in these grooves 74. Thus after final compressing of the assembly, and subsequent firing, the outer surface of the glow plug comprises one or more conductive paths formed by the outer conductor or resistor 252 and exposed portions of the insulating layer 250. Although only two grooves 74 and corresponding stripes of resistor layer 252 are depicted in FIGS. 7-8, it will be appreciated that any number of one or more can be used, and that the grooves 74 can be straight longitudinal as depicted, helically twisting, or otherwise.

Obviously, many modifications and variations of the present invention are possible in light of the above teachings. It is, therefore, to be understood that within the scope of the appended claims, the invention may be practiced otherwise than as specifically described.

What is claimed is:

1. A method for forming a layered heating element for a glow plug, said method comprising the steps of:

pre-forming an electrically conductive core as a self-supporting body;

pre-forming an electrically non-conducting insulator layer having an exterior as another self-supporting body distinct from the pre-formed core;

pre-forming an electrically resistive layer as a further self-supporting body distinct from the pre-formed core and the pre-formed insulator layer;

assembling a precursor structure by substantially enveloping the pre-formed core within the pre-formed insulator layer and applying the pre-formed resistive layer to the exterior of the insulator layer;

compressing the precursor structure; and sintering the compressed precursor structure to form a monolithic heating element with the core bonded to the insulator layer and the insulator layer bonded to the resistive layer.

2. The method of claim 1 wherein said step of pre-forming the core includes mixing an electrically conductive powder with an organic binder and a lubricant.

3. The method of claim 2 wherein said step of pre-forming the core includes pressing the electrically conductive powder, organic binder and lubricant in a mold to form a self-supporting article.

4. The method of claim 1 wherein said step of pre-forming the insulator layer includes mixing an electrically non-conductive powder with an organic binder and a lubricant.

5. The method of claim 4 wherein said step of pre-forming the insulator layer includes pressing the electrically non-conductive powder, organic binder and lubricant in a mold to form a self-supporting article.

6. The method of claim 1 wherein said step of pre-forming the resistive layer includes mixing an electrically resistive powder with an organic binder and a lubricant.

7. The method of claim 6 wherein said step of pre-forming the resistive layer includes pressing the electrically resistive powder, organic binder and lubricant into a self-supporting article.

8. The method of claim 1 wherein said step of compressing the precursor structure includes forcing the precursor structure through an extrusion die.

9. The method of claim 1 wherein said step of compressing the precursor structure includes forcing the precursor structure into a closed-end die.

10. The method of claim 1 wherein said step of compressing the precursor structure includes subjecting the precursor structure to iso-static pressure.

11. The method of claim 1 wherein said step of compressing the precursor structure includes rotating the precursor structure between compression rollers.

12. The method of claim 1 wherein said steps of pre-forming the core, insulator layer and resistive layer each include mixing a powder with a binder and a lubricant, further including the step of removing at least some of the lubricant from the compressed precursor structure.

13. The method of claim 12 wherein said step of removing the lubricant occurs simultaneously with said sintering step.

14. The method of claim 12 wherein said step of removing the lubricant occurs prior to said sintering step.

15. The method of claim 12 further including the step of removing a portion of the binder from the compressed precursor structure prior to said sintering step.

16. The method of claim 1 further including the step of pre-forming an electrically conductive jacket, and said step of assembling a precursor structure including substantially enveloping the resistive layer within the jacket prior to said compressing step.

17. The method of claim 16 wherein said step of pre-forming the jacket includes mixing an electrically conductive powder with an organic binder and a lubricant.

18. The method of claim 17 wherein said step of pre-forming the jacket includes pressing the electrically conductive powder, organic binder and lubricant in a mold to form a self-supporting article.

19. The method of claim 16 further including the step of removing a portion of the jacket after said sintering step to form a high temperature tip for the heating element.

20. The method of claim 1 further including the step of establishing an electrical connection between the core and the resistive layer.

21. The method of claim 20 wherein said step of establishing an electrical connection between the core and the resistive layer includes affixing an electrically conductive tip after said sintering step.

22. The method of claim 1 further including the steps of:

providing a shell;

inserting the sintered heating element into the shell; and establishing an electrically conductive connection between the shell and the resistive layer.

23. The method of claim 22 further including the step of inserting a center wire into the shell, establishing an electrically conductive connection between the core and the center wire, and establishing an electrically insulating barrier between the center wire and the shell.

24. The method of claim 1 further including the step of forming at least one groove in the exterior of the insulating layer, and said step of assembling the precursor structure including inserting the resistive layer in the groove prior to said compressing step.

25. The method of claim 24 further including the step of forming at least one groove in the exterior of the insulating layer, and said step of assembling the precursor structure including inserting the resistive layer in the groove prior to said compressing step.

26. The method of claim 24 further including the steps of:

providing a shell;

inserting the sintered heating element into the shell; and establishing an electrically conductive connection between the shell and the resistive layer.

* * * * *

UNITED STATES PATENT AND TRADEMARK OFFICE

CERTIFICATE OF CORRECTION

PATENT NO. : 7,607,206 B2
APPLICATION NO. : 11/321908
DATED : October 27, 2009
INVENTOR(S) : Walker, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this

Twelfth Day of October, 2010

David J. Kappos
*Director of the United States Patent and Trademark Office*